(12) United States Patent
Hitzschke et al.

(10) Patent No.: US 8,284,153 B2
(45) Date of Patent: Oct. 9, 2012

(54) DISCHARGE LAMP FOR DIELECTRICALLY IMPEDED DISCHARGE WITH RIB-LIKE SUPPORTING ELEMENTS BETWEEN THE BOTTOM PLATE AND THE TOP PLATE

(75) Inventors: Lothar Hitzschke, München (DE); Frank Vollkommer, Gauting (DE)

(73) Assignee: Osram AG, Munich (DE)

( * ) Notice: Subject to any disclaimer, the term of this patent is extended or adjusted under 35 U.S.C. 154(b) by 958 days.

(21) Appl. No.: 12/227,299

(22) PCT Filed: May 31, 2007

(86) PCT No.: PCT/EP2007/055301
§ 371 (c)(1),
(2), (4) Date: Nov. 13, 2008

(87) PCT Pub. No.: WO2007/141179
PCT Pub. Date: Dec. 13, 2007

(65) Prior Publication Data
US 2009/0096715 A1 Apr. 16, 2009

(30) Foreign Application Priority Data
Jun. 2, 2006 (DE) .......................... 10 2006 026 332

(51) Int. Cl.
*G09G 3/36* (2006.01)
(52) U.S. Cl. ........ 345/102; 345/211; 345/204; 345/690; 313/491; 313/493; 313/631; 362/600; 362/58; 362/246; 362/291
(58) Field of Classification Search .................... 345/32, 345/102, 211–213, 690–696; 313/493, 491, 313/484, 483, 631, 620, 622, 582, 292, 234; 315/56, 58, 291, 246, 274, 287, 209 R, 224, 315/225; 362/97.1, 600–607
See application file for complete search history.

(56) References Cited

U.S. PATENT DOCUMENTS

| 5,337,068 A | 8/1994 | Stewart et al. |
| 5,461,397 A * | 10/1995 | Zhang et al. .................. 345/102 |
| 5,994,849 A | 11/1999 | Vollkommer et al. |
| 6,034,470 A | 3/2000 | Vollkommer et al. |
| 6,246,171 B1 | 6/2001 | Vollkommer et al. |

(Continued)

FOREIGN PATENT DOCUMENTS
CN 1113582 C 7/2003
(Continued)

OTHER PUBLICATIONS

Japanese Office Action dated Jan. 10, 2012 (and English translation thereof) in counterpart Japanese Application No. 2009-512598.

*Primary Examiner* — Quan-Zhen Wang
*Assistant Examiner* — Jennifer Nguyen
(74) *Attorney, Agent, or Firm* — Holtz, Holtz, Goodman & Chick, PC

(57) ABSTRACT

The present invention relates to a discharge lamp with a floor plate and a roof plate, which is designed for dielectrically impeded discharge, with at least two electrodes of different polarity being allocated to the sections of the discharge space, which is divided by rib-like support elements, with the electrodes located at a distance from the longitudinal support elements.

23 Claims, 7 Drawing Sheets

U.S. PATENT DOCUMENTS

| | | | |
|---|---|---|---|
| 6,252,352 B1 | 6/2001 | Vollkommer et al. | |
| 6,353,294 B1 | 3/2002 | Wammes et al. | |
| 6,376,989 B1 | 4/2002 | Vollkommer et al. | |
| 6,388,374 B1 | 5/2002 | Vollkommer et al. | |
| 6,411,039 B1 | 6/2002 | Vollkommer et al. | |
| 6,531,822 B1 | 3/2003 | Vollkommer et al. | |
| 6,636,004 B1 | 10/2003 | Vollkommer et al. | |
| 6,762,549 B2 | 7/2004 | Hitzschke et al. | |
| 6,853,124 B1 | 2/2005 | Vollkommer et al. | |
| 6,917,354 B2* | 7/2005 | Fujishiro et al. | 345/102 |
| 6,976,898 B2 | 12/2005 | Hitzschke et al. | |
| 6,984,932 B2 | 1/2006 | Hitzschke et al. | |
| 7,144,288 B2 | 12/2006 | Hitzschke et al. | |
| 7,304,430 B2 | 12/2007 | Jang et al. | |
| 7,956,547 B2* | 6/2011 | Maeda et al. | 315/205 |
| 2002/0163311 A1 | 11/2002 | Hitzschke et al. | |
| 2004/0114396 A1 | 6/2004 | Kobayashi et al. | |
| 2005/0111237 A1 | 5/2005 | Moon et al. | |
| 2005/0184666 A1 | 8/2005 | Park et al. | |
| 2006/0006805 A1 | 1/2006 | Son et al. | |
| 2006/0006806 A1 | 1/2006 | Reich et al. | |
| 2006/0076880 A1 | 4/2006 | Park et al. | |
| 2008/0018575 A1 | 1/2008 | Kobayashi et al. | |
| 2008/0084155 A1 | 4/2008 | Jang et al. | |
| 2009/0200943 A1 | 8/2009 | Yamashita et al. | |
| 2009/0251497 A1* | 10/2009 | Hitzschke et al. | 345/697 |
| 2009/0267964 A1* | 10/2009 | Hitzschke et al. | 345/690 |

FOREIGN PATENT DOCUMENTS

| | | |
|---|---|---|
| CN | 1499262 A | 5/2004 |
| CN | 1585996 A | 2/2005 |
| CN | 1214443 C | 8/2005 |
| DE | 198 17 479 A1 | 6/1999 |
| DE | 198 17 480 A1 | 9/1999 |
| DE | 198 45 228 A1 | 4/2000 |
| DE | 10138924 A1 | 2/2003 |
| EP | 1 615 256 A1 | 1/2006 |
| JP | 9-050784 A | 2/1997 |
| JP | 2000-500916 A | 1/2000 |
| JP | 2000-500917 A | 1/2000 |
| JP | 2001-110364 A | 4/2001 |
| JP | 2001-250510 A | 9/2001 |
| JP | 2002-093379 A | 3/2002 |
| JP | 2003-217521 A | 7/2003 |
| JP | 2004-163828 A | 6/2004 |
| JP | 2005-123189 A | 5/2005 |
| JP | 2006-024569 A | 1/2006 |
| TW | 5213 | 2/2003 |
| TW | 569278 | 1/2004 |
| TW | 583712 | 4/2004 |
| TW | 200418081 A | 9/2004 |
| TW | 200606976 A | 2/2006 |
| WO | WO 91/10223 A1 | 7/1991 |
| WO | WO 92/02947 A1 | 2/1992 |
| WO | WO 98/43276 A1 | 10/1998 |
| WO | WO 98/43277 A2 | 10/1998 |
| WO | WO 02/27759 A1 | 4/2002 |
| WO | WO 0227761 A1 | 4/2002 |
| WO | WO 03/083898 A1 | 10/2003 |
| WO | WO 2005/066086 A2 | 7/2005 |

* cited by examiner

Detail B

Detail C

Detail D

Detail E

Detail A

Detail B

Detail C

Detail D

Detail E

DISCHARGE LAMP FOR DIELECTRICALLY IMPEDED DISCHARGE WITH RIB-LIKE SUPPORTING ELEMENTS BETWEEN THE BOTTOM PLATE AND THE TOP PLATE

This application is a U.S. National Phase Application under 35 USC 371 of International Application PCT/EP2007/055301, filed May 31, 2007, which is incorporated herein in its entirety by this reference.

TECHNICAL FIELD

The present invention relates to a discharge lamp with a bottom plate and a top plate which is designed for dielectrically impeded discharges.

PRIOR ART

Discharge lamps in which so-called dielectrically impeded discharges are generated by a dielectric barrier between the electrodes or at least the anodes and the discharge medium have been known for a relatively long period of time. An important application case is in so-called flat lamps, whose discharge vessel is constructed from a bottom plate and a top plate or at least contains these two plates as essential parts in addition to other parts such as, for example, a frame connecting them. Such flat lamps can be used in particular for backlighting monitors, display screens and other display devices, but are also suitable for general lighting. The discharge vessel is flat, i.e. has a markedly smaller extent in one dimension than in the other two dimensions.

In relation to the prior art, particular reference is made to the prior art by the Applicant DE 100 48 187.6, DE 100 48 186.8, DE 101 38 924.8 and DE 101 38 925.6.

DESCRIPTION OF THE INVENTION

Against the background of this prior art, the invention is based on the technical problem of specifying a new and improved construction for a corresponding discharge lamp.

In this regard, the invention relates to a discharge lamp with a bottom plate, a top plate for the light exit which is at least partially transparent, a discharge space between the bottom and the top plate for accommodating a discharge medium, a set of electrodes for generating dielectrically impeded discharges in the discharge medium, a dielectric barrier between at least one part of the set of electrodes and the discharge medium and at least one supporting element, which produces a connection between the bottom plate and the top plate in order for them to support one another and is in the form of ribs with the bottom plate and the top plate bearing linearly against one another, the electrodes being in the form of strips and running in their main direction parallel to the rib-like supporting element, characterized in that in each case at least two electrodes of different polarity are associated with each of the parts of the discharge space which are separated by the supporting element, and the electrodes are spaced apart in the region of the discharges from the linear bearing of the bottom plate and the top plate in the region of the supporting element.

In addition, the invention relates to a combination of the discharge lamp with an electronic ballast and to a display device, which contains a discharge lamp according to the invention for backlighting. For example, this may be a television screen or a computer monitor.

Preferred configurations are specified in the dependent claims and will be explained in more detail below alongside the central concept of the invention.

The term dielectrically impeded discharge or barrier discharge lamp in the present invention relates to discharges which take place in mercury-free discharge media, in particular discharge media with a substantial content of noble gas. Xenon and the radiation of xenon-excimers is particularly important here.

According to the invention, the supporting elements, which are unavoidable in practically interesting formats, are provided in a linear rib-like formation between the bottom plate and the top plate of a flat lamp discharge vessel. In this case, the invention also includes the case in which only a single such rib-like supporting element is provided, but cases with a large number of supporting elements are preferred.

Depending on the number of supporting elements, the discharge space is split between the top plate and the bottom plate into channel-like parts, which do not need to be separated from one another, however. The supporting elements therefore do not need to pass over the entire length.

In contrast to the cited prior art, it is additionally provided that in this case at least two electrodes of different polarity, i.e. at least one cathode and at least one anode, are associated with the parts of the discharge space which are separated by the supporting elements, and these electrodes are spaced apart from the regions corresponding to the linear bearing of the supporting elements. This spacing is at least in the region of the discharges, i.e. at least at and between the discharges, but not necessarily also in the region of the feed lines. In this case, the term "spaced apart" relates to the plane in which the electrode strips lie. The term is therefore intended to be two-dimensional in the projection in this plane. If the electrodes or part of the electrodes lie outside of the discharge vessel, as is anyway preferred in the context of this invention, the spacing which is brought about by the corresponding plate thickness between the electrodes and the linear bearing is therefore not intended. Instead, the electrodes should lie in the projection on the mentioned plane not beneath but adjacent to the linear bearing.

The term the linear bearing in this case moreover does not necessarily mean a line width corresponding to virtually zero. Instead, the width of the bearing should be markedly smaller than the length. However, relatively narrow bearing faces are much preferred.

In the cited prior art, although rib-like supporting elements have already been mentioned, they were positioned on the electrode strips. In other words, the electrode strips run partially beneath the supporting elements in order to be "blocked" by them. Individual discharge structures should therefore be separated from one another.

In the present invention, however, as a deviation from this, a blocking influence of the supporting elements or of the discharge vessel walls at all on the discharge structure is not intended to be utilized, but instead avoided. The electrodes are therefore intended to run spaced apart from them. In the case of outer electrodes, for example beneath the bottom plate, the discharges within the discharge vessel attach approximately at the point which is in each case closest to the outer electrode. This point should then likewise be spaced apart from the bearing line.

It has been found that the supporting elements and regions of the top or bottom plate can be charged electrostatically and the interference-free formation of discharges can be prevented. The inventors assume that this is disadvantageous for an efficient and geometrically favorable formation of discharges. If necessary, the possibility for a "drawing-up" of the discharges along part of the electrode strip lengths should also be provided with the invention. This would be disrupted if the electrodes (with the explained projection into the plane of the electrode strips) were to lie in the region of the linear bearing between the plates or between the plates and the supporting elements.

In addition, it is preferred for the supporting elements to be made from a transparent material, in particular from glass, in order to absorb as little of the light produced as possible.

As has already been mentioned in the cited prior art, the supporting elements can favorably be formed integrally as an integral part of the bottom plate or the top plate. For example, the top plate can have a corresponding wave structure, whose "troughs" reach down as supporting elements onto the bottom plate. For illustrative purposes, reference is made to the exemplary embodiment.

Preferably, where the supporting elements come near to one of the plates and form the linear bearing, they form an angle in the range of 35° to 55°, particularly preferably between 40° and 50°, with this plate. Such angles have proven to be favorable in terms of the stability of the discharge vessels produced, the light distribution, the spaces available for the discharge structures and the lamp thicknesses which are produced overall.

The bottom plate or the top plate can be curved entirely or partially in annularly concave fashion between the supporting elements, with the term "concave" being from the perspective of the discharge vessel interior. For example, the top plate can have integrated supporting elements which touch the bottom plate at an angle of 45° in the form of V and produce entirely or partially rounded transitions between these V structures.

A favorable plate thickness for the discharge vessel walls, in particular the top plate and the bottom plate, is in the range of between 0.8 and 1.1 mm, inclusive, particularly preferably between 0.9 and 1.0 mm, inclusive.

The bearing of the supporting elements against one of the plates which has already been mentioned a number of times does not necessarily need to be bearing in the sense of there being no fixed connection. The supporting elements can be adhesively bonded or attached in some other way. However, a purely bearing arrangement without any further adhesive bonding or else sealing is actually preferred. This can be produced particularly simply and does not introduce any further contaminations into the discharge space as a result of no additional materials being used.

It has already been mentioned that the electrodes are preferably provided outside of the discharge vessel. They can be positioned, for example, on a foil so as to bear against one of the plates, in particular be adhesively bonded to it. This foil can have a copper layer which is structured by means of etching techniques and which is used to form the electrodes. Outer electrodes provide a particularly simple, reliable and fault-free embodiment of the dielectric required between the electrodes and the discharge medium and are particularly favorable in terms of production technology and also inexpensive.

In addition, it is preferably provided that the electrodes can be driven in groups, i.e. can be operated with different operating parameters from one another or else can be operated entirely independently of one another. In this case, the groups can each comprise a plurality of pairs of electrodes, but also they may comprise a single pair of electrodes. Preferably, the splitting of the groups is matched to the splitting of the electrodes between the discharge space parts between the supporting elements. In particular, the groups can in each case correspond to the electrodes in such a discharge space part. Groupwise operation can be used, for example, for row-like or more generally linear switching, in which certain groups are operated at a lighter or darker level than the remaining groups. More details are given in this regard below.

A further aspect of the invention relates to a discharge lamp, in which, in addition, the anodes and the cathodes are labeled as such and are configured such that they can be distinguished from one another, and the cathodes and the anodes, when viewed from peripheral regions, in each case occur in pairs, i.e. each anode is adjacent to an anode and a cathode and each cathode is adjacent to a cathode and an anode. The basic idea in this case consists in both the cathodes and the anodes being provided in pairs. Thus, each anode should have a cathode adjoining it on one side and a further anode adjoining it on the other and, conversely, each cathode should have an anode adjoining it on one side and a further cathode adjoining it on the other. Peripheral regions are naturally not affected by this as well since a peripheral electrode naturally has nothing next to it on one side.

Discharge lamps in which the anodes and cathodes cannot be distinguished from one another also fall under this aspect of the invention since they are combined with a ballast designed for unipolar operation.

The inventors have established that, as a result of such an electrode structure, the discharge structures can be "drawn up" along the strip lengths of the electrodes more easily to form longer discharge structures, primarily at high powers, and the discharge operation between respectively most closely adjacent anodes and cathodes is moreover barely influenced by the discharge operation between other anodes and cathodes. This is not the case with strip-shaped electrode structures with alternating cathodes and anodes previously known in the prior art. In this case, discharge structures end on the same electrodes on different sides and can interact with one another, i.e. can therefore also be mutually disruptive. This relates in particular to the abovementioned "drawing-up" of the discharge structures, which, in the context of the present invention, is even possible over the entire electrode length. In addition, the double electrodes allow the individual discharge structures to have a denser sequence along the electrode strips and therefore overall allow for a surprisingly dense total discharge distribution when the distance between electrodes of the same polarity within a pair is not too great.

In the prior art WO 98/43276, which has already proposed double anode strips, the cathodes are also common, i.e. singular, and this is also very desirable for reasons of saving space and the homogenization of the luminance distribution. This document only provides electrode strips in pairs only for those lamps which are designed for bipolar operation and therefore do not distinguish between cathodes and anodes. However, the present invention relates to lamps that are designed especially for unipolar operation and make it possible to distinguish between the cathodes and anodes. This can be the case, for example, as a result of the fact that the anodes, but not the cathodes, are dielectrically separated from the discharge medium. It can also be provided by virtue of the fact that the cathodes have projections for fixing discharge structures which the anodes do not have or which are less pronounced in the case of the anodes, which is preferred in the present case and which is described in more detail below.

The electrode structure according to the invention also allows for a favorable assignment of electrode pairs to discharge vessel parts, in particular those separated by the supporting elements. Finally, it allows for favorable interconnections, in the case of which the electrodes are driven separately in groups, it being possible for the groups to comprise a respective plurality of pairs or else individual pairs.

The abovementioned more pronounced projections for the localization of individual discharge structures can be tab-like projections transverse with respect to the main strip direction of the electrodes, as shown in the exemplary embodiment.

They are preferably more pronounced, i.e. more pointed or more localized in another way in the case of the cathodes than in the case of the anodes, if the anodes have comparable structures at all. In the case of the anodes, actual "tabs" are less preferred than slight waves or saw-tooth shapes, which slightly modulate the discharge spacing along the strip length and typically produce minimum discharge spacings in the region of the "cathode tabs", also as a result of a slight tapering of the anodes towards the cathodes. From there, the discharge structures can "draw up" towards the sides at high powers and therefore also fill regions with relatively large discharge spacings.

The projections for localizing individual discharge structures can also be distributed in heterogeneous densities, for example can be slightly denser in peripheral regions than in central regions, in order to counteract dimmed portions at the periphery.

In the case of the cathode pairs according to the invention, it is moreover preferred for the projections to alternate along the strip direction, i.e. in the direction of the strip for a projection pointing towards the right of the right-hand cathode to be followed by a projection pointing towards the left of the left-hand cathode, and vice versa, with the result that the discharge structures localized towards both sides are positioned alternately.

It is additionally preferred that the inner pair spacings are smaller than the spacings between the most closely adjacent electrodes of different polarity, with the result that the total arrangement of individual discharge structures to a certain extent remains dense and there are no excessively large strips which are unused.

Finally, the minimum discharge spacings between the electrodes are preferably at least 10 mm large. The basic idea in this case consists in using particularly large discharge spacings or "clearances", as a deviation from the relevant prior art. Quite surprisingly it has been found that unusually good efficiencies can be achieved given discharge spacings of over 10 mm, particularly preferably even over 11, 12 or in the most favorable case over 13 mm, with these efficiencies being capable of being two-digit percentage values above comparable electrode structures with smaller discharge spacings.

The improvements thus achieved are so noticeable that they justify the increased requirements as regards the technology for the ballast which result from the higher operating voltages required.

It has even surprisingly been found that, despite the size of the gaps between the discharge structures which also correlates with the discharge spacing in any case in the event of individual discharge structures and prior to total "drawing-up" along the electrode strips, a very high degree of total homogeneity can nevertheless be achieved. This is true in particular in conjunction with the mentioned double electrode pairs which, as mentioned, allow for a relatively dense arrangement of the discharge locations along the electrode strips.

Conventional discharge spacings in lamps for dielectrically impeded discharges were typically in the region of 4 or 5 mm. Until now it has been assumed that excessively large discharge spacings in any case result in unnecessary losses in terms of the ballast and should therefore be avoided.

A further configuration of the invention is directed at a display device with a locally controllable brightness filter as the display screen and a discharge lamp configured as described above for backlighting, in which the set of electrodes is split into locally separate groups, which can be driven separately from one another the brightness filter having linearly driven pixels, and the electrode groups forming strips which are linearly parallel to the pixels, the display device being designed to operate the electrode groups synchronously with the driving of the pixels for reinputting brightness image information into the corresponding lines at a lighter level than in the remaining operational phases.

The basic concept of this configuration consists in combining the groupwise splitting of the set of electrodes of the discharge lamp known per se with the lamp's application for backlighting a display screen and, during operation, matching it to the driving of the pixels of certain image lines of the display screen. This driving of the pixels is meant to mean the inputting of actual figurative light/dark information which results in the figures and contours displayed. If, synchronously therewith, that/those electrode group(s) which backlight(s) the corresponding line region is/are operated at a higher brightness level than the remaining electrode groups, to a certain extent an arbitrarily introduced line interlacing method can be produced. In this case, the display screen lines with the new image information appear to be brighter than the remaining ones, with the term "brighter" also including the remaining electrode groups being switched to dark.

The advantage consists in the fact that, in this way, a sharper image perception is produced in the human eye in the case of rapidly moving image information, i.e. in the case of figurative patterns which move rapidly on the display screen. Typical display screens in the sense of brightness filters, i.e. in particular liquid crystal displays, have a limited response time and can therefore only be operated at a limited rate when the new image information is input. In the case of rapid represented movements, this results in the moving figure having moved on by a considerable amount between the individual reinputting operations with which a new image is produced. If the preceding representation of this figure practically has an afterglow in the time, which corresponds to the image refresh rate, before the reinputting of image information, the eye is to a certain extent provided with a rearward movement in the sense of a sequence of standstills lasting for certain times with movement jumps in between. Such representations are perceived by the human eye as a movement of a blurred figure.

If, instead, a moving point, for example, is displayed by the display device according to the invention, this tends to mean a short illumination of the corresponding image information, whereupon this image information becomes either darker or totally dark, until this point briefly reappears (lighter) when information is reinput at the new location. Such a representation is perceived by the human eye as a movement of a point with a sharp or relatively sharp contour if the image refresh rate is sufficiently high and therefore interpolates the eye. These fundamental relationships are known per se as so-called "scanning backlights".

In the case of display devices, in particular flat screens with particularly flat barrier lamps for backlighting, this invention proposes making use of the fundamentally favorable possibilities of such barrier lamps for groupwise interconnection and therefore using a relatively large lamp (or a few relatively large lamps) to implement a scanning backlight technology which does not require a large number of relatively small lamps or even conventional electrode beam technology.

Preferably, in each case an overlap is provided between the respective bright operational phases, i.e. the electrode groups whose bright operation phases follow one another temporally are switched simultaneously to be light for a certain time span which is shorter than the length of the bright operational phase. For explanatory purposes, reference is made to the exemplary embodiment.

It is also preferred to synchronize the operation of the electrode groups in the case of a pulsed operation method which is nevertheless very advantageous for barrier discharge lamps and is known from the relevant prior art and in which the actual lamp operation is operated at a pulse frequency of the order of magnitude of two-digit kilohertz values or above. That is to say that if, between adjacent electrode groups which run through their bright operational phases temporally successively even in the most important applications, states occur, as a result of the mentioned overlap or for other reasons, in which such adjacent electrode groups are simultaneously connected to the output of a ballast, it could otherwise result in flashovers, in particular also between electrodes with the same name, in the event of a lack of synchronization. If, however, there is synchronization, the voltage pulses are simultaneous and therefore no particular difficulties result.

Synchronization is also useful between electrode groups which are in one bright operational phase and adjacent electrode groups which are switched to be darker since in this case at least the magnitude of the relative voltages is substantially lower. Electrode groups which are switched to be very dark must not cause any problems here since they can be switched off on the supply side and therefore DC-isolated or switched at a high resistance.

The option of allowing the electrode groups which are not located in the bright operational phase to be very dark and therefore of virtually switching them off forms a particular advantage of the invention. In fact, discharge lamps which are operated, for example, with mercury-containing plasma can barely be used in an operating mode associated with continuously successive restarting operations.

In accordance with a further configuration of the invention, the splitting into separately operable groups can be taken further still to form units which are referred to here as electrode subgroups. These units are intended to be assigned dyes of different colors, preferably three or more, with the result that, in the case of the respective pulse-like backlighting of a display screen region with pixels which have just been redescribed with image information, a sequential sequence of differently colored backlighting pulses is produced. A color representation without the use of the actually conventional and high-loss color filters and without the loss of the resolution of the brightness filter, in particular liquid crystal display, can therefore take place.

In addition, matching to image contents, i.e. their brightness values in certain parts of the image, can also take place. Thus, for example, in the case of an image with a light sky over a dark lower image region, the electrode groups in the upper region can be operated at a higher power than in the lower region.

The invention will be explained in more detail below with reference to an exemplary embodiment with different variants.

The features disclosed herein can also be essential to the invention in other combinations.

PREFERRED EMBODIMENT OF THE INVENTION

Figure 1:
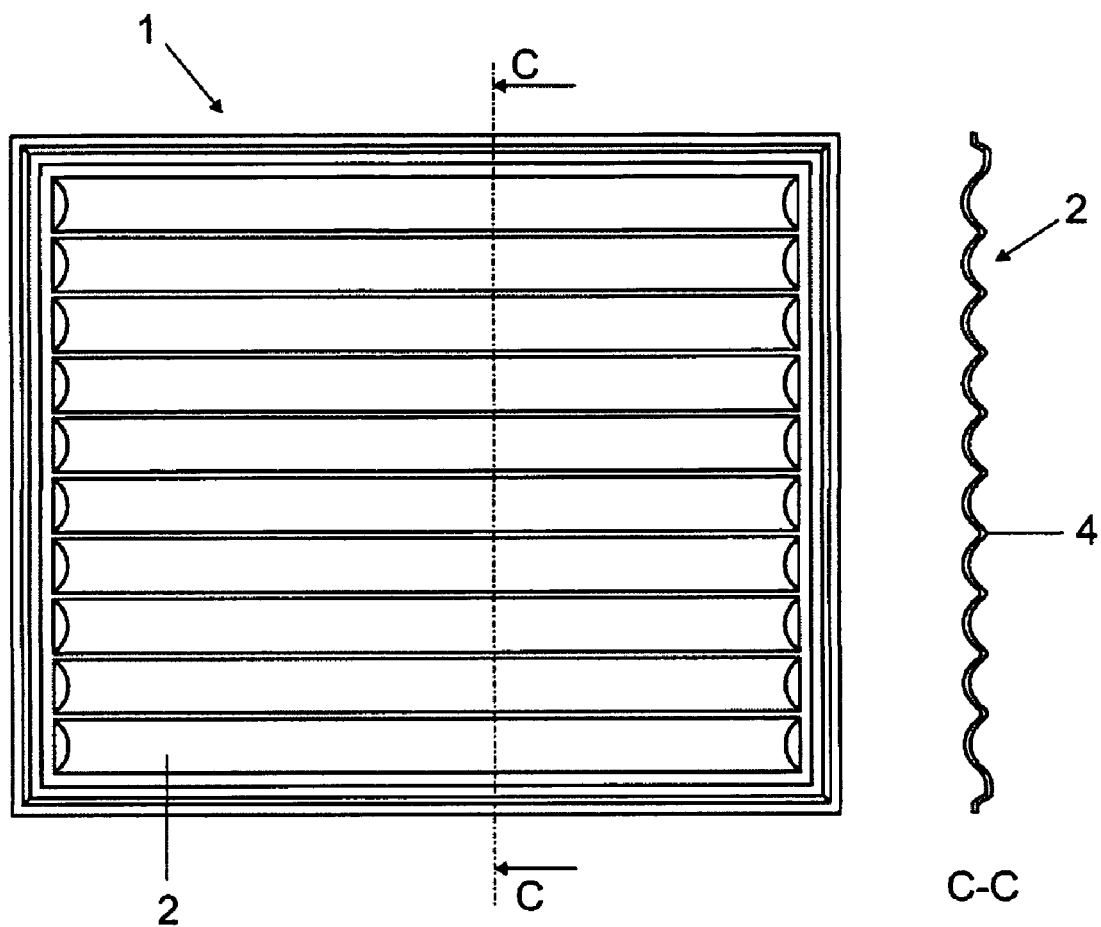
FIG. 1 shows a schematized plan view of a barrier discharge lamp according to the invention with a sectional view, shown to the right thereof, of part of the discharge lamp.
Figure 2:
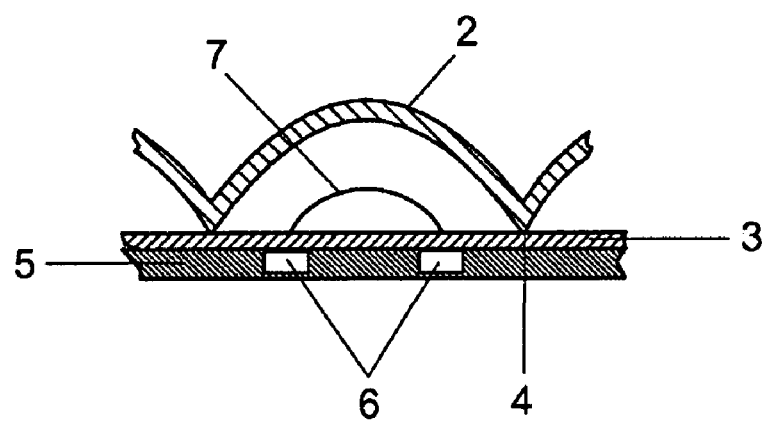
FIG. 2 shows a detail of a sectional illustration of the discharge lamp from FIG. 1.

FIG. 1 shows a plan view of a discharge vessel of a barrier discharge lamp 1 according to the invention. Next to it on the right is a cross section through a top plate of the discharge vessel, as sectional illustration C-C. FIG. 2 shows, in the same viewing direction and sectional plane, a detail of the discharge vessel, but with the bottom plate and the electrode structure together. It can be seen that the flat lamp discharge vessel substantially comprises a rib-like top plate 2 and a substantially flat bottom plate 3, the top plate 2 having V-shaped ribs as supporting elements at 45° relative to the bottom plate 3, which supporting elements are denoted by the numeral 4 at the point at which they bear linearly on the bottom plate 3. The top plate 2 runs annularly concavely between these rib-like supporting elements 4, i.e. approximately circularly over the discharge space.

An electrode film 5 with copper electrodes 6 provided therein is provided beneath the bottom plate 3, with the result that the bottom plate 3 acts as a dielectric barrier between the electrodes 6 and the discharge space. The electrode film is a PEN or PET substrate material with a thickness of 50-100 μm and a copper layer attached by adhesive bonding of approximately 15-45 μm, which is structured by an etching method. The film is also adhesively bonded onto the bottom plate also with an acrylic adhesive of 50-100 μm. FIG. 2 shows an arcuate individual discharge 7 between the two electrodes 6 shown therein.

The supporting element spacing used here between the linear bearing faces 4 is 22.9 mm. The top plate 2 and the bottom plate 3 each have a thickness of 0.9 mm given a length of 322 mm and a width of 246 mm and a total thickness of the discharge lamp 1 of 6.7 mm. This is a 16.2" lamp. The bottom plate 3 is coated on its upper side with a reflector layer (not illustrated) of $Al_2O_3$ for the reflection of the visible light, on which reflector layer, as well as on the underside of the top plate 2, a phosphor layer (likewise not illustrated) is positioned. The supporting elements 4 rest on the bottom of the discharge vessel coated in this way, and a gas-tight joint by means of glass solder is provided only on the outer lamp periphery. The fill comprises 110 mbar of Xe and 250 mbar of Ne coldfilling pressure.

Figure 3:
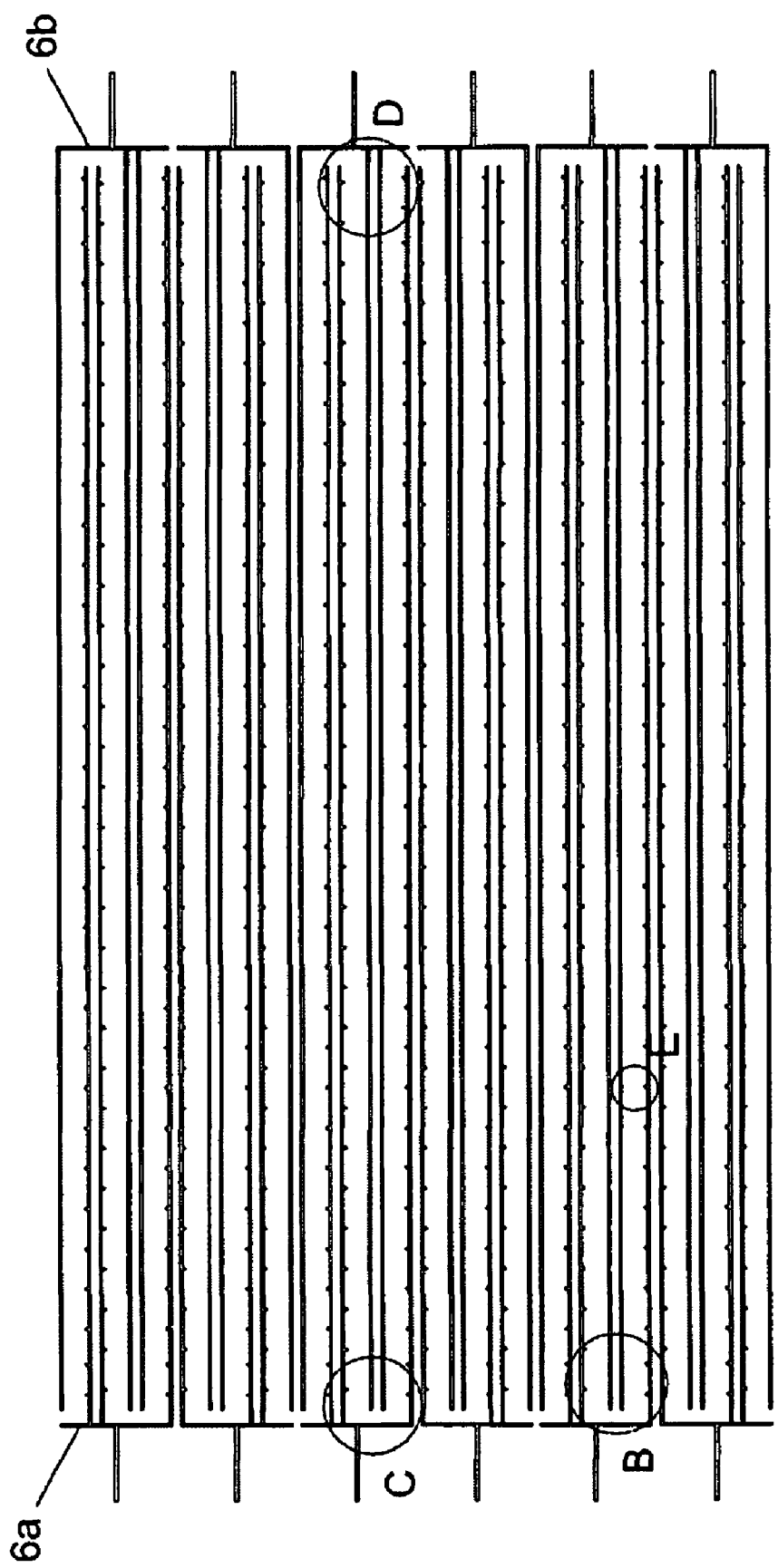
FIG. 3 shows at the top right a plan view of an exemplary electrode structure for a discharge lamp according to the invention with further detail illustrations.
Figure 3:
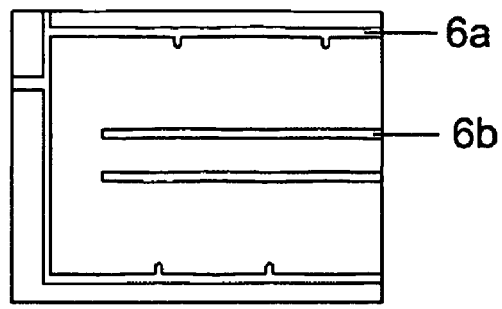
Figure 3:
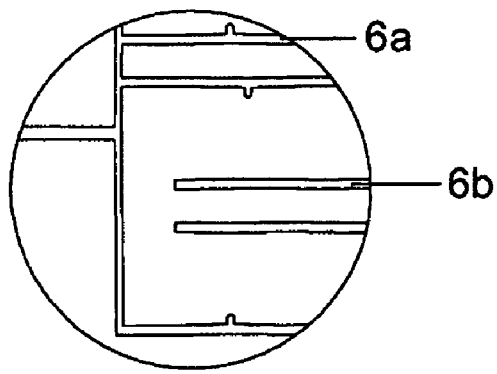
Figure 3:
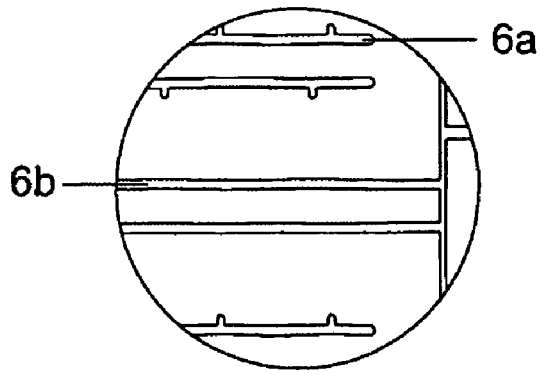
Figure 3:
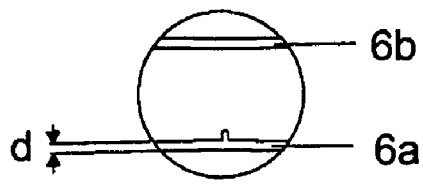
Figure 4:
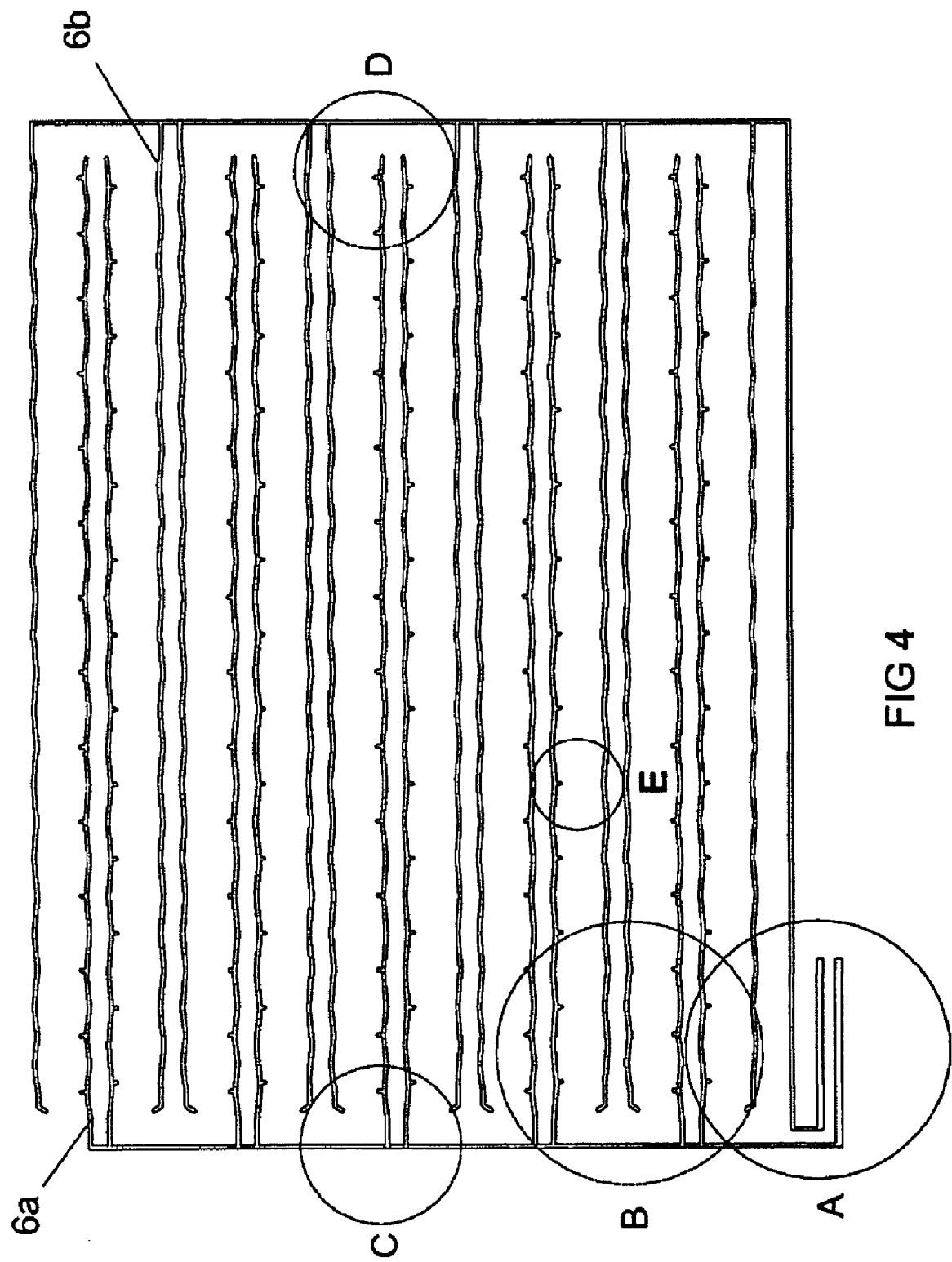
FIG. 4 shows a variant of the plan view illustrated in FIG. 3 of an exemplary electrode structure for a discharge lamp according to the invention with further detail illustrations.
Figure 4:
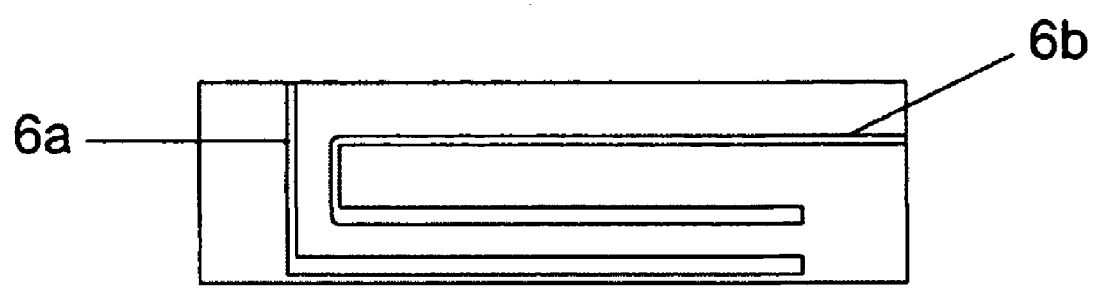
Figure 4:
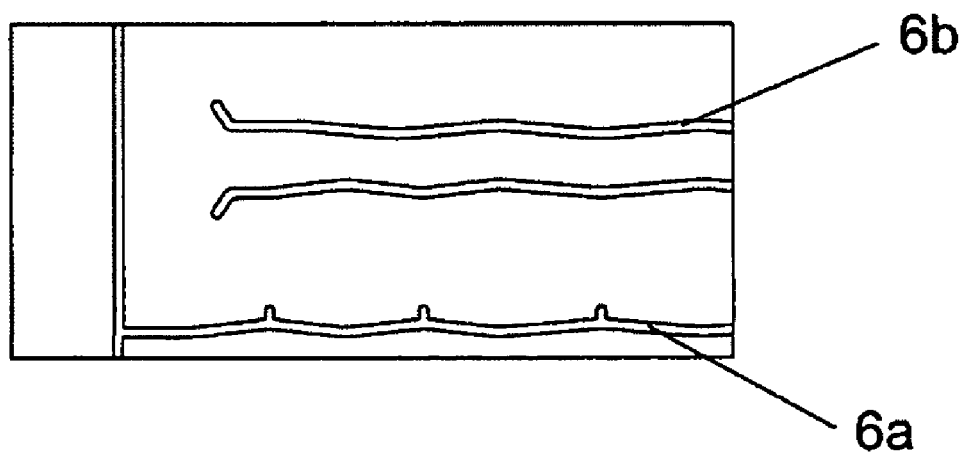
Figure 4:
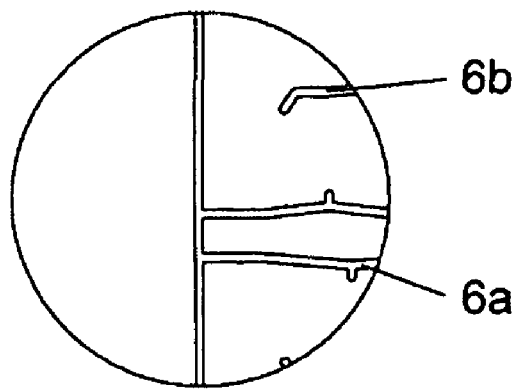
Figure 4:
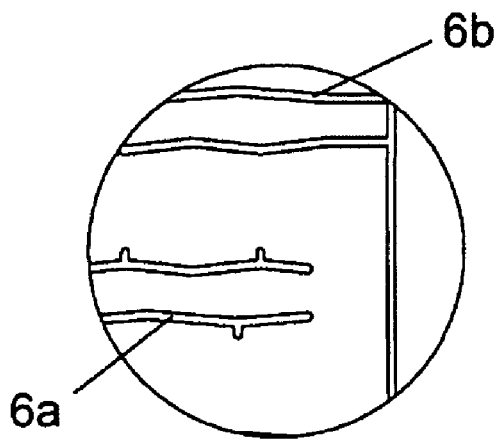
Figure 4:
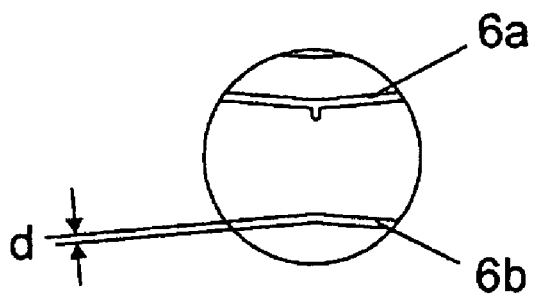

FIG. 3 and FIG. 4 show exemplary electrode structures for discharge lamps of this type. At the top right, in each case plan views of the total electrode structure are illustrated, while the remaining illustrations represent the details from the electrode structures which are denoted by the letters A-E.

In this case, the cathodes are each denoted by 6a and the anodes by 6b, the cathodes 6a having the tab-like projections already known from the prior art for fixing individual discharge structures. These projections are visibly slightly more dense at the peripheries of the strips in order to counteract dimmed portions at the periphery.

It can be seen in FIG. 3 that the electrode strips 6a and 6b, apart from the peripheral regions acting as the power supply means, are configured so as to be straight and parallel and in each case form pairs. In FIG. 4, the electrode strips are slightly curved, to be precise the anode strips 6b are also curved although they do not have any of the abovementioned tabs.

The variant in FIG. 4 corresponds to the format of the discharge lamp 1 from FIG. 1, while the variant in FIG. 3 is larger, namely a 32" lamp with a length of 722 mm and a width of 422 mm given a total thickness of 6.7 mm. For reasons of stability, the top plate is in this case 1.0 mm thick. The rib spacing remains identical. In both cases, the same electrode spacings of 13.7 mm are also present, with these being mean electrode spacings. The electrode widths are in each case 1.45 mm.

Furthermore, the electrode structure in FIG. 3 is split into in total six anode groups and six cathode groups, this resulting in total six parallel electrode groups which follow from top to bottom, can be operated separately and therefore correspond to switchable light strips. Corresponding splitting into electrode groups is not illustrated in the variant in FIG. 4, but, as can easily be seen, can be readily implemented.

With lamps of this type, luminances of 13500 cd/m$^2$ and 7000 cd/m$^2$ have been achieved given system powers (including the ballast) of, for example, 80 W in the case of the 16.2" lamp and 193 W in the case of the 32" lamp, respectively, which corresponds to efficiencies of 11.7 cd/W and 10.2 cd/W, respectively. The color loci were located at x=0.312 and y=0.327 and, respectively, x=0.297 and y=0.293, a three-band phosphor with the blue component $BaMgAl_{10}O_{17}$: $Eu^{2+}$, the green component $LaPO_4$: ($Tb^{3+}$, $Ce^{3+}$) and the red component $(Y,Gd)BO_3$:$Eu^{3+}$ having been used.

In this regard, a two-stage electronic ballast with a first step-up converter stage and an intermediate circuit voltage of between 80 and 100 V and a second unipolar power stage in accordance with the flyback converter principle for pulsed supply has been used.

Other supporting point spacings of between 15 and 40 mm or more and other electrode spacings of up to in the region of 30 mm or more are naturally also possible.

The increase in efficiency in comparison with comparable lamps with a discharge spacing of approximately 4.5 mm was of the order of magnitude of up to 40%. A further enlargement to a discharge spacing of 15.7 mm resulted in an increase in efficiency of even up to 50% or more. In principle, in this case the supporting point spacings need to be matched. In particular, the spacing between the electrodes and the adjacent "ribs", i.e. the bearing lines denoted by reference symbol 4 in FIG. 2, should be 1 mm, preferably 2 mm and further preferably 3 mm or more at least in the case of the anodes, preferably in the case of all of the electrodes.

Different possible fill compositions are, for example, 130 mbar of Xe and 230 mbar of Ne or 90 mbar of Xe and 270 mbar of Ne.

In addition to the gain in efficiency, the discharge vessel shape has the advantage that the surface contacts of the discharges with the top plate 2 are reduced in comparison with knob-like supporting elements known from the prior art. This can be seen in a gain in efficiency and in increased running stability. The ribbed top plates 2 can be produced more easily and more cost-effectively, result in fewer tool costs, and simplify the coating process for the phosphor coating of the top plate 2.

The loss of stability of which there is actually a risk as a result of the shape with one-dimensional ribs is kept within limits despite the relatively small plate thicknesses. With the given data, no particular difficulties were observed.

In addition to the separate operability and the clear assignment to the discharge space parts which are separated by the rib-like supporting elements 4, the pairwise electrode structure also has the advantage that each individual electrode strip only "has" discharges on in each case one side. The discharges therefore impede one another to a lesser extent, can be packed more densely along the strip direction and also "draw up" better along the strip length in particular in the case of markedly increased powers. Despite the tab projections, this takes place to such an extent that discharge structures extending along the entire strip length are possible. The tabs therefore only define the attachment locations of the individual discharges at relatively low powers and facilitate the starting operation.

Figure 5:
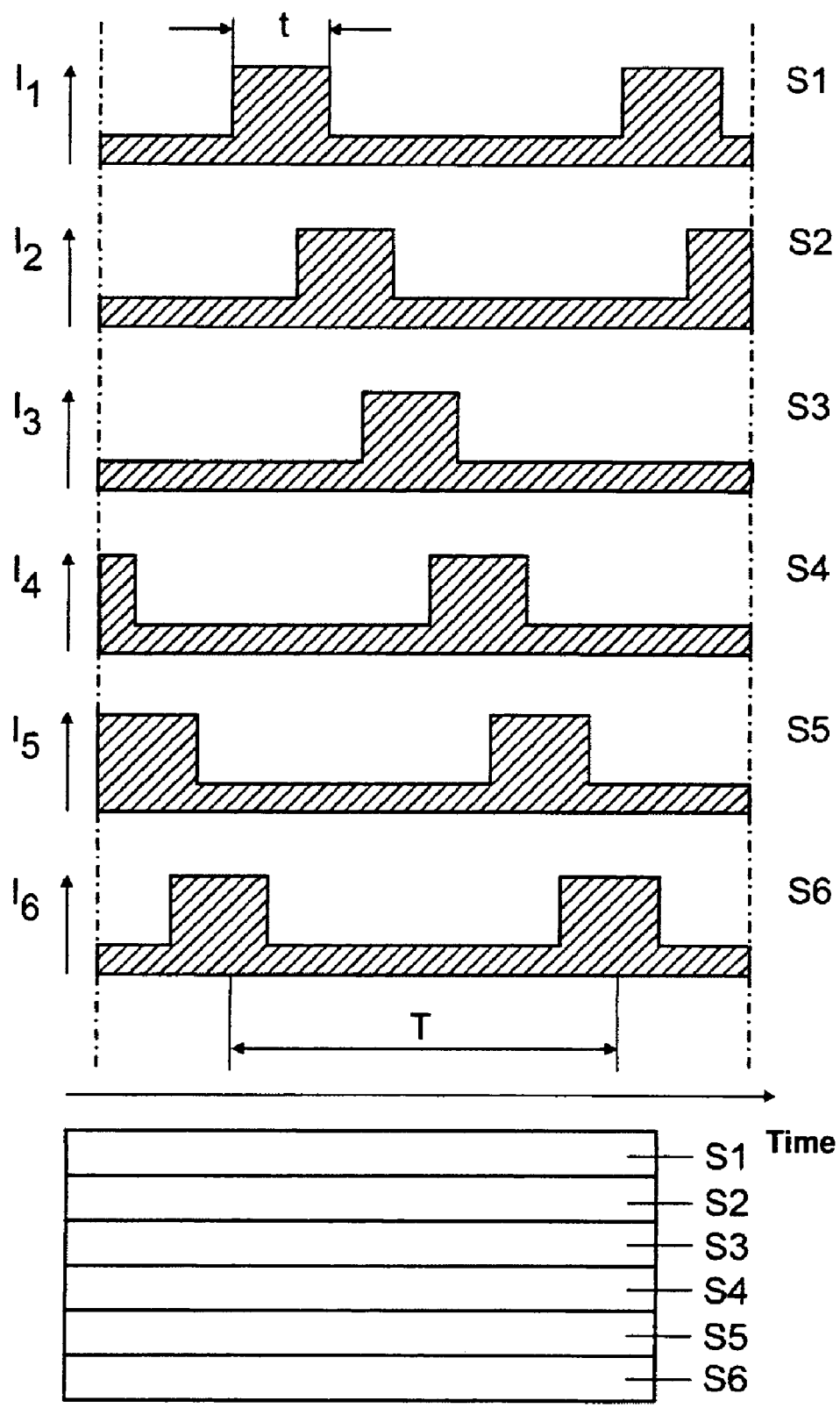
FIG. 5 shows schematized timing diagrams for the operation, with groupwise switching, of a discharge lamp according to the invention with an electrode structure as shown in FIG. 3.

FIG. 5 shows an operating method which has been made possible by the electrode structure shown in FIG. 3 which has been split groupwise and also by a variant of the electrode structure shown in FIG. 4 which has been correspondingly split groupwise, using schematic timing diagrams. First, in the lower region FIG. 5 illustrates that the rectangular area assumed by the electrode structure shown in FIG. 3, in accordance with the explanations which have already been given in the description relating to FIG. 3, corresponds to six separately operable light strips S1-S6. The upper region of FIG. 5 shows a very schematized illustration of the intensity profile over time for these six strips during a period T. In this case, the references $I_1$-$I_6$ on the vertical axis represent the intensity emitted by the individual groups, while the horizontal axis represents the time.

It can be seen that, at the beginning the period T, for a pulse duration of t, a markedly increased intensity is generated in the group or the light strip S1, while the group S1 only generates an intensity which is approximately 30% of this value during the remaining time. Corresponding bright operational phases of the duration t are provided for all of the other groups S2-S6, to be precise in each case temporally offset such that there is a temporal overlap of the bright operational phases of t/3 between the groups, and the bright operational phase of group S6 by t/3 after the end of the period duration T, i.e. again overlapping with the next bright operational phase of group S1.

Thus, light strips run sequentially from top to bottom over the screen and, in this example, in each case overlap one another by a third of their illumination time t, the remaining regions which are not detected at that time by the bright strip being operated at a lower intensity.

For example, the period T could be 20 ms, while the individual bright operational phase duration t is approximately 5 ms. In one variant, the overlap could be dispensed with, in which case t would be 3.3 ms. In another variant, for which the barrier discharge lamps are particularly well suited, the intensity outside of the bright operational phases could be 0, i.e. the electrode groups which are not located in the bright operational phase at that time would be completely switched off.

The invention claimed is:

1. A discharge lamp comprising:
   a bottom plate,
   a top plate for light exit, the top plate being at least partially transparent,
   a discharge space between the bottom plate and the top plate for accommodating a discharge medium,
   a set of electrodes for generating dielectrically impeded discharges in the discharge medium, the set of electrodes comprising an anode and cathode which are labeled as such and are distinguishable from one another,
   a dielectric barrier between at least one part of the set of electrodes and the discharge medium, wherein at least the anode is separated from the discharge medium by the dielectric barrier, and
   at least one rib-like supporting element which produces a structural connection between the bottom plate and the top plate and is in the form of ribs with the bottom plate and the top plate bearing linearly against one another, wherein the electrodes are in the form of strips and run in a main direction parallel to the rib-like supporting element, wherein the supporting element separates the discharge space into parts, and at least two electrodes of different polarity are associated with each of the parts of the discharge space which are separated by the supporting element, the two electrodes being spaced apart in a region of the discharge space from a position at which the bottom plate and the top plate linearly bear against each other through the supporting element, and wherein the cathode comprises a cathode pair, and the anode comprises an anode pair, a first anode of the anode pair being adjacent to a second anode of the anode pair and a second cathode of the cathode pair, and a first cathode of the cathode pair being adjacent to the second cathode and the second anode, except at peripheral regions of the lamp.

2. The discharge lamp as claimed in claim 1, wherein a plurality of the rib-like supporting elements are provided which run parallel to one another, and wherein at least two electrodes of different polarity are associated with a respective part of the discharge space which is defined between adjacent supporting elements.

3. The discharge lamp as claimed in claim 1 or 2, wherein the supporting element(s) is/are formed from a transparent material.

4. The discharge lamp as claimed in claim 1, wherein the supporting element(s) is/are formed integrally with one of the bottom plate and the top plate.

5. The discharge lamp as claimed in claim 4, wherein the supporting element(s) form(s) an angle of between 35° and 55° with a respective other one of the bottom plate and the top plate.

6. The discharge lamp as claimed in claim 4, wherein the supporting element(s) only bear(s) against a respective other one of the top plate and the bottom plate.

7. The discharge lamp as claimed in claim 1, wherein one of the bottom plate and the top plate is curved in an annularly concave fashion between adjacent supporting elements.

8. The discharge lamp as claimed in claim 1, wherein the top plate and the bottom plate have a thickness of between 0.8 and 1.1 mm.

9. The discharge lamp as claimed in claim 1, wherein the electrodes are provided outside of a discharge vessel comprising at least the bottom plate and the top plate.

10. The discharge lamp as claimed in claim 1, wherein the electrodes are capable of being driven in groups.

11. A display device with a locally controllable brightness filter as a display screen and the discharge lamp as claimed in claim 10 for backlighting, the brightness filter having linearly driven pixels and the electrode groups forming strips parallel to the pixel lines, wherein the display device is designed to operate the electrode groups synchronously with the driving of the pixels for the purpose of reinputting brightness image information into the corresponding lines at a lighter level than in remaining operational phases.

12. The display device as claimed in claim 11, wherein successive operational phases of lighter operation of the electrode groups have a temporal overlap with one another.

13. The display device as claimed in claim 11 or 12, wherein the discharge lamp is operated using a pulsed method and the corresponding pulsed operation of the electrode groups is synchronized with respect to one another.

14. The display device as claimed in claim 11, wherein the electrode groups remain switched off outside the operational phases with the lighter operation.

15. The display device as claimed in claim 11, further comprising an electronic ballast for supplying the discharge lamp, which ballast has a dedicated output stage for each electrode group.

16. The display device as claimed in claim 11, wherein each electrode group to be operated synchronously with the driving of pixels when reinputting brightness image information is split into at least two electrode subgroups, which can in turn be operated separately, the discharge lamp having a dedicated associated phosphor layer with a color deviating from color(s) of the respective other electrode subgroup(s) for each of the electrode subgroups, with the result that, by means of a temporally sequential operation of the electrode subgroups, the associated pixels can be backlit temporally sequentially with different colors.

17. The discharge lamp as claimed in claim 1, wherein the cathodes have more pronounced projections than the anodes, for localization of individual discharge structures.

18. The discharge lamp as claimed in claim 17, wherein the projections are denser in the peripheral regions of the lamp than in a central region of the lamp.

19. The discharge lamp as claimed in claim 17 or 18, wherein the projections of a pair of the cathodes alternate along a strip direction.

20. The discharge lamp as claimed in claim 1, wherein the spacing between the paired electrodes is smaller than an interval to a closest adjacent electrode of a different polarity.

21. The discharge lamp as claimed in claim 1, wherein a minimum discharge spacing between the anodes and cathodes of a pair is at least 10 mm.

22. The discharge lamp as claimed in claim 1, further comprising an electronic ballast for unipolar operation of the discharge lamp.

23. A display device with the discharge lamp as claimed in claim 1, the discharge lamp being used for backlighting the display device.

* * * * *